(12) United States Patent
Lee et al.

(10) Patent No.: US 10,933,883 B2
(45) Date of Patent: Mar. 2, 2021

(54) DRIVING CONTROL APPARATUS AND METHOD FOR VEHICLE

(71) Applicants: HYUNDAI MOTOR COMPANY, Seoul (KR); KIA MOTORS CORPORATION, Seoul (KR)

(72) Inventors: Dong Hwi Lee, Seongnam-si (KR); Su Jung Yoo, Incheon (KR); Na Eun Yang, Gyeonggi-do (KR); Sung Min Park, Seoul (KR); Keon Yup Chu, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 217 days.

(21) Appl. No.: 16/162,617

(22) Filed: Oct. 17, 2018

(65) Prior Publication Data
US 2020/0031362 A1 Jan. 30, 2020

(30) Foreign Application Priority Data
Jul. 26, 2018 (KR) .......................... 10-2018-0087085

(51) Int. Cl.
*B60W 50/02* (2012.01)
*B60W 30/09* (2012.01)
*B60W 30/14* (2006.01)
*B60W 50/14* (2020.01)

(52) U.S. Cl.
CPC ........ *B60W 50/0225* (2013.01); *B60W 30/09* (2013.01); *B60W 30/14* (2013.01); *B60W 50/0205* (2013.01); *B60W 50/14* (2013.01); *B60W 2554/80* (2020.02)

(58) Field of Classification Search
CPC .. B60W 50/0225; B60W 30/09; B60W 50/14; B60W 30/14; B60W 50/0205; B60W 2554/80; B60W 2050/0297; B60W 30/12; B60W 50/029; B60W 60/0055; B60W 60/0059; B60R 16/0232
See application file for complete search history.

(56) References Cited

U.S. PATENT DOCUMENTS

2019/0185018 A1* 6/2019 Tao .................. B60W 50/14
2019/0382031 A1* 12/2019 Hu ................... G05D 1/0088

* cited by examiner

*Primary Examiner* — Nga X Nguyen
(74) *Attorney, Agent, or Firm* — Brinks Gilson & Lione

(57) ABSTRACT

A driving control apparatus for a vehicle includes: one or more external sensors, one or more vehicle sensors, a steering device, an acceleration/deceleration device, an output device, a communication circuit, and a control circuit. The control circuit detects a failure associated with autonomous driving while the vehicle performs the autonomous driving, outputs the warning signal for a transfer of control of the vehicle by using the output device for a first time interval, when the failure is detected, controls the acceleration/deceleration device for a second time interval after the first time interval to reduce a travel speed of the vehicle to a target speed, and controls the steering device and the acceleration/deceleration device after the second time interval to maintain a travel lane of the vehicle with the travel speed lower than the target speed.

18 Claims, 7 Drawing Sheets

DRIVING CONTROL APPARATUS AND METHOD FOR VEHICLE

CROSS-REFERENCE TO RELATED APPLICATION

This application claims priority to and the benefit of Korean Patent Application No. 10-2018-0087085, filed on Jul. 26, 2018, the entire contents of which are incorporated herein by reference.

FIELD

The present disclosure relates to an apparatus and method for vehicle driving control upon detection of a failure in a system inside a vehicle.

BACKGROUND

The statements in this section merely provide background information related to the present disclosure and may not constitute prior art.

Autonomous driving systems and driving assistance systems partially enabling autonomous driving (hereinafter, for the convenience of description, both autonomous driving and driving assist being referred to as autonomous driving) have been developed, with the development of automotive industry. An autonomous driving system may provide various functions, such as set speed keeping, inter-vehicle distance keeping, lane keeping, lane change, and the like. The autonomous driving system may perform autonomous driving using various apparatuses, such as a sensor for detecting an external environment of a vehicle, a sensor for detecting information about the vehicle, a GPS, a detailed map, a driver status detection system, a steering actuator, an acceleration/deceleration actuator, a communication circuit, a control circuit (e.g., an electronic control unit (ECU)), and the like.

SUMMARY

For operations of the autonomous driving system, various apparatuses are desired as described above. When some of the apparatuses fail, the autonomous driving system cannot operate normally. During autonomous driving, a driver may be in danger when an apparatus associated with the autonomous driving fails. Therefore, a strategy for reducing the driver's risk in case of a failure in a part of the autonomous driving system needs to be developed.

The present disclosure has been made to solve the above-mentioned problems occurring in the prior art while advantages achieved by the prior art are maintained intact.

An aspect of the present disclosure provides an apparatus and method for performing a vehicle control strategy for reducing a risk when an autonomous driving system fails.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a driving control apparatus for a vehicle includes: one or more external sensors that detect information about surroundings of the vehicle, one or more vehicle sensors that detect information of the vehicle, a steering device that controls a steering angle of the vehicle, an acceleration/deceleration device that controls a speed of the vehicle, an output device that outputs a warning signal inside the vehicle, a communication circuit in communication with an external device, and a control circuit electrically connected to the one or more external sensors, the one or more vehicle sensors, the steering device, the acceleration/deceleration device, the output device, and the communication circuit. The control circuit detects a failure associated with autonomous driving while the vehicle performs the autonomous driving, outputs the warning signal for a transfer of control of the vehicle by using the output device for a first time interval, when the failure is detected, controls the acceleration/deceleration device for a second time interval after the first time interval to reduce a travel speed of the vehicle to a target speed, and controls the steering device and the acceleration/deceleration device after the second time interval to maintain a travel lane of the vehicle with the travel speed lower than the target speed.

In one form, the control circuit may control the steering device and the acceleration/deceleration device for the first time interval to maintain the travel lane of the vehicle and a distance between the vehicle and a front vehicle, when the failure is detected.

According to an exemplary form, the control circuit may consistently output the warning signal after the first time interval.

According to another form, the control circuit may control the acceleration/deceleration device to stop the vehicle and may allow the vehicle to remain at rest, when a front vehicle stops after the second time interval.

According to one form, the control circuit may activate hazard lights when the vehicle stops.

According to another form, the control circuit may control the acceleration/deceleration device for a second time interval to reduce the travel speed of the vehicle to the target speed, when the failure is included in a first category. The control circuit may control the acceleration/deceleration device for the second time interval to stop the vehicle, when the failure is included in a second category.

In one form, the second category may include at least one of inability to track the center of the travel lane, failures in the one or more vehicle sensors, inability to control a distance between the vehicle and a front vehicle, a failure in a network inside the vehicle, and a failure in the control circuit, and the first category may include failures other than the second category.

According to one form, the control circuit may activate hazard lights and may notify the external device of an emergency situation through the communication circuit, when the vehicle stops.

According to another form, the control circuit may transfer control of the vehicle to a driver of the vehicle when intervention by the driver is recognized.

According to other form, the control circuit may transmit a predicted travel path for the first time interval and a second time interval after the first time interval, to the steering device and the acceleration/deceleration device, and the steering device and the acceleration/deceleration device may operate for the second time interval to stop the vehicle along the predicted travel path, when a failure in a network inside the vehicle or a failure in the control circuit is detected.

In one exemplary form, the steering device and the acceleration/deceleration device may detect the failure in the network inside the vehicle or the failure in the control circuit.

In another exemplary form, the steering device and the acceleration/deceleration device may transfer control of the vehicle to a driver of the vehicle, when intervention by the driver is recognized.

According to one form, the one or more external sensors may include radar, lidar, and a camera.

According to another form, the one or more vehicle sensors may include a yaw rate sensor, a tire pressure detection sensor, a steering wheel angle sensor, and a wheel speed sensor.

According to another aspect of the present disclosure, a driving control method for a vehicle may include: detecting a failure associated with autonomous driving while the vehicle performs the autonomous driving; outputting, by a control circuit, a warning signal for a transfer of control of the vehicle for a first time interval, when the failure is detected; controlling, by the control circuit, the vehicle for a second time interval to reduce a travel speed of the vehicle to a target speed; and controlling, by the control circuit, the vehicle after the second time interval to maintain a travel lane of the vehicle with the travel speed lower than the target speed.

According to one form, the method may further include controlling, by the control circuit, the vehicle to stop the vehicle and allowing the vehicle to remain at rest, when a front vehicle stops after the second time interval.

According to one form, the controlling of the vehicle for the second time interval may include controlling the vehicle for the second time interval to reduce the travel speed of the vehicle to the target speed, when the failure is included in a first category and controlling the vehicle for the second time interval to stop the vehicle, when the failure is included in a second category.

According to another form, the method may further include activating, by the control circuit, hazard lights when the vehicle stops and notifying an external device of an emergency situation.

According to one form, the method may further include transferring, by the control circuit, control of the vehicle to a driver of the vehicle when intervention by the driver is recognized.

According to one form, the method may further include computing, by the control circuit, a predicted travel path for the first time interval and the second time interval and controlling the vehicle for the second time interval to stop the vehicle along the predicted travel path, when a failure in a network inside the vehicle or a failure in a control circuit is detected.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
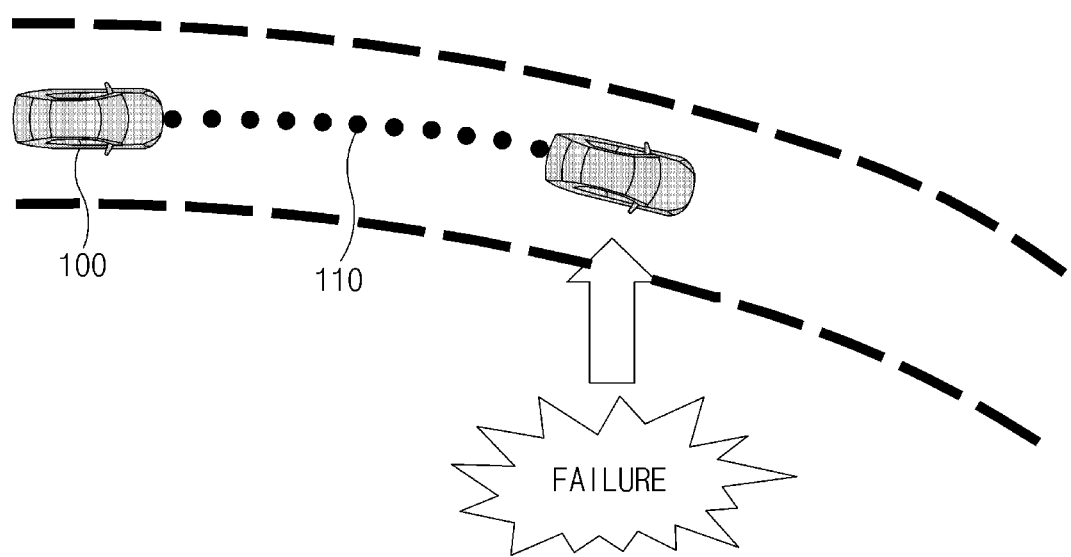
FIG. 1 illustrates an operating environment of a vehicle driving control apparatus.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that even if shown in different drawings, identical elements are provided with identical reference numerals in the drawings. Furthermore, in describing the forms of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these tams. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates an operating environment of a vehicle driving control apparatus in one form of the present disclosure.

Referring to FIG. 1, a vehicle 100 may perform autonomous driving. The vehicle 100 may travel along a path 110 that is generated by an autonomous driving system. While the vehicle 100 performs the autonomous driving, a part of the autonomous driving system may fail. A driver may be in danger when the vehicle 100 continues to perform the autonomous driving after the occurrence of the failure. The vehicle 100 may detect the failure associated with the autonomous driving and may control the behavior of the vehicle 100, depending on a strategy for reducing the risk. For example, the vehicle 100 may perform various risk reduction strategies, such as warning-signal output, speed reduction control, stop control, and/or notification of an emergency situation. The vehicle 100 may determine the type of the failure and may perform a risk reduction strategy appropriate for the type of the failure. The above-described risk reduction strategy will be described below in detail with reference to FIGS. 2 to 6.

Figure 2:
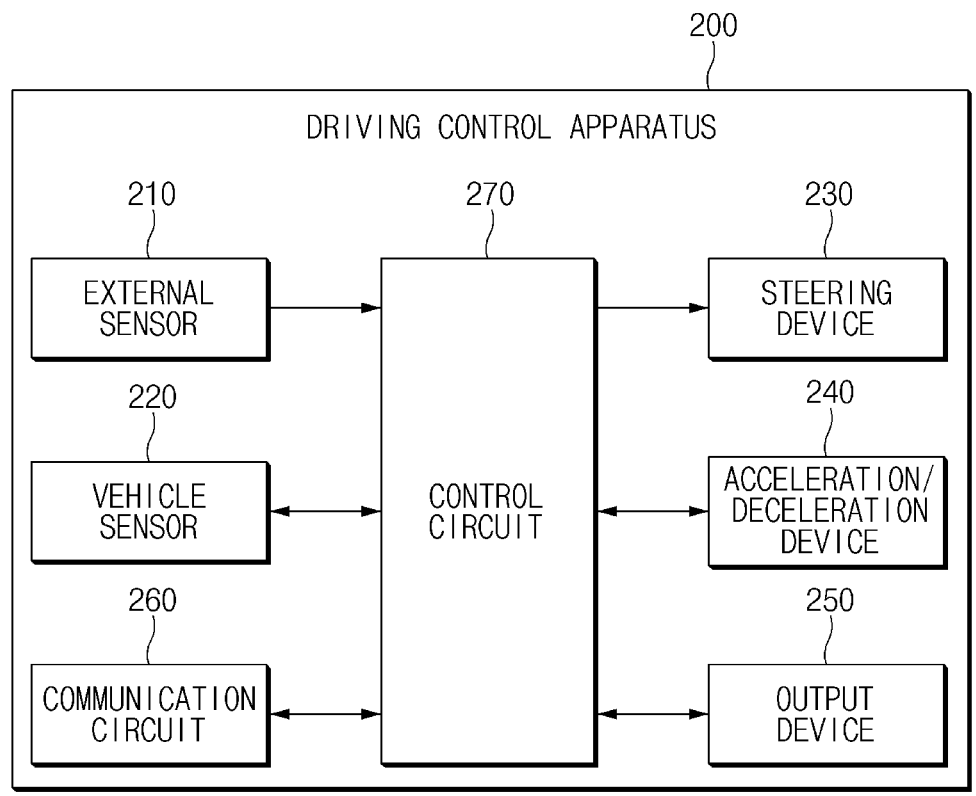
FIG. 2 is a block diagram illustrating a configuration of the vehicle driving control apparatus.

FIG. 2 is a block diagram illustrating a configuration of the vehicle driving control apparatus in one form of the present disclosure.

Referring to FIG. 2, the vehicle driving control apparatus 200 (hereinafter, for the convenience of description, referred to as the "apparatus 200") may include an external sensor 210, a vehicle sensor 220, a steering device 230, an acceleration/deceleration device 240, an output device 250, a communication circuit 260, and a control circuit 270. The apparatus 200 may be a part of the autonomous driving system and may be mounted in the vehicle.

The external sensor 210 may detect information about surroundings of the vehicle. The external sensor 210 may include, for example, radar, lidar, and/or a camera.

The vehicle sensor 220 may detect information about the vehicle. The vehicle sensor 220 may include, for example, a yaw rate sensor, a tire pressure detection sensor, a steering wheel angle sensor, and/or a wheel speed sensor.

The steering device 230 may control a steering angle of the vehicle. The steering device 230 may include, for example, a steering wheel, an actuator that operates in conjunction with the steering wheel, and a controller (e.g., an electronic control unit (ECU)) that controls the actuator.

The acceleration/deceleration device 240 may control the speed of the vehicle. The acceleration/deceleration device 240 may include, for example, a throttle, a brake, an actuator that operates in conjunction with the throttle and the brake, and a controller (e.g., an ECU) that controls the actuator.

The output device 250 may output a warning signal inside the vehicle. The output device 250 may include, for example, a speaker, a display, and/or a vibration motor.

The communication circuit 260 may be in communication with an external device. For example, the communication circuit 260 may notify a call center of an emergency situation.

The control circuit 270 may be electrically connected to the external sensor 210, the vehicle sensor 220, the steering device 230, the acceleration/deceleration device 240, the output device 250, and the communication circuit 260. The control circuit 270 may control the external sensor 210, the vehicle sensor 220, the steering device 230, the acceleration/deceleration device 240, the output device 250, and the communication circuit 260 and may process and compute a variety of data. The control circuit 270 may have the following technologies implemented therein: a sensor fusion technology for combining the information perceived by the sensors; a map processing technology for using a detailed map in the autonomous driving; a precise positioning technology for estimating the precise position of the vehicle by combining GPS and the sensor information; a determination technology for determining a driving situation to a destination; and a control technology for controlling the vehicle. The control circuit 270 may be connected to the external sensor 210, the vehicle sensor 220, the steering device 230, the acceleration/deceleration device 240, the output device 250, and/or the communication circuit 260 by one or more of communication schemes, such as Ethernet, controller area network (CAN), CAN with flexible data-rate (CAN-FD), and the like.

According to one form, while the vehicle performs autonomous driving, the control circuit 270 may detect a failure associated with the autonomous driving. The failure associated with the autonomous driving may refer to a failure in a component associated with the autonomous driving, such as the external sensor 210, the vehicle sensor 220, a GPS, a detailed map, a driver status detection module, the control circuit 270, or the like. When the failure associated with the autonomous driving occurs, the autonomous driving may not be performed normally. Meanwhile, when the steering device 230 and/or the acceleration/deceleration device 240 fails, it is impossible to control the vehicle. Therefore, the failure associated with the autonomous driving in this disclosure may not include failures in the steering device 230 and the acceleration/deceleration device 240. The control circuit 270 may detect failures in, for example, the external sensor 210, the vehicle sensor 220, the GPS, the detailed map, the driver status detection module, and the control circuit 270.

According to one form, when the failure is detected, the control circuit 270 may output a warning signal for a transfer (or handover) of control of the vehicle, using the output device 250 for a first time interval (e.g., about 4 s). According to another form, when the failure is detected, the control circuit 270 may control the steering device 230 and the acceleration/deceleration device 240 for the first time interval to maintain the travel lane of the vehicle and the distance between the vehicle and a front vehicle. The control circuit 270 may provide the warning signal to the driver for the first time interval, while allowing the vehicle to continue to travel on the travel lane.

According to other form, after the first time interval, the control circuit 270 may control the acceleration/deceleration device 240 for a second time interval (e.g., about 6 s) to reduce the travel speed (e.g., 100 kph) of the vehicle to a target speed (e.g., 65 kph). The control circuit 270 may control the acceleration/deceleration device 240 for the second time interval to allow the travel speed to reach the target speed. The control circuit 270 may consistently output the warning signal after the first time interval, when intervention by the driver is not recognized. The warning signal output for the second time interval may be the same as, or different from, the warning signal output for the first time interval.

According to an exemplary form, after the second time interval, the control circuit 270 may control the steering device 230 and the acceleration/deceleration device 240 to maintain the travel lane of the vehicle with the travel speed lower than the target speed. The control circuit 270 may perform lane keeping control and inter-vehicle distance keeping control within the travel lane to prevent the travel speed of the vehicle from exceeding the target speed and prevent the vehicle from colliding with an object ahead.

According to another exemplary form, after the second time interval, the control circuit 270 may control the acceleration/deceleration device 240 to stop the vehicle and may allow the vehicle to remain at rest, when the forward vehicle comes to a stop. The control circuit 270 may stop the vehicle when the forward vehicle is detected to stop while the control circuit 270 controls the vehicle to travel at the target speed. For example, stopping a vehicle on a highway may cause a rear-end collision, and therefore the vehicle may be safer when stopping due to the forward vehicle than when immediately stopping due to a failure therein. The control circuit 270 may activate hazard lights when the vehicle stops. Even if the forward vehicle starts again, the control circuit 270 may allow the vehicle to remain at rest since the failure in the autonomous driving system was detected.

According to one form, the control circuit 270 may transfer the control of the vehicle to the driver when intervention by the driver of the vehicle is recognized. The control circuit 270 may immediately transfer the control to the driver when the driver intervention is recognized while the control circuit 270 performs control depending on the above-described risk reduction strategy.

According to another form, when the failure is included in a first category, the control circuit 270 may control the acceleration/deceleration device 240 for the second time interval to reduce the travel speed of the vehicle to the target speed, and when the failure is included in a second category, the control circuit 270 may control the acceleration/deceleration device 240 for the second time interval to stop the vehicle. The control circuit 270 may provide a risk reduction strategy appropriate for the type of the failure.

According to another aspect of the present disclosure, the second category may include inability to track the center of the travel lane, failures in one or more vehicle sensors 220, inability to control the distance between the vehicle and the forward vehicle, a failure in a network inside the vehicle, and a failure in the control circuit 270. The second category may include failures that disable, for example, lane keeping control, forward vehicle tracking control, or inter-vehicle distance keeping control. The inability to track the center of the travel lane may refer to, for example, a state where there are abnormalities in both the camera and the detailed map. The inability to control the distance between the vehicle and the forward vehicle may refer to, for example, a state in which there are abnormalities in all of the camera, the radar, and the lidar. The failure in the network inside the vehicle may refer to, for example, a state in which there are abnormalities in the connections between the control circuit 270 and the other components (e.g., the external sensor 210, the vehicle sensor 220, the steering device 230, the acceleration/deceleration device 240, the output device 250, and/or the communication circuit 260). The failure in the control circuit 270 may refer to, for example, a state in which there is an error in software that is executed by the control circuit 270.

According to one form, the first category may include failures other than the second category. The first category may include failures in which, for example, lane keeping control, forward vehicle tracking control, and inter-vehicle distance keeping control are possible. For example, when the lidar sensor fails, the failure may be included in the first category since the control circuit 270 is capable of recognizing an object ahead using the camera and the radar.

As described above, even though a failure is detected, the control circuit 270 may perform speed reduction control when lane keeping control, forward vehicle tracking control, and inter-vehicle distance keeping control are possible, and may perform stop control when lane keeping control, forward vehicle tracking control, or inter-vehicle distance keeping control is impossible.

When the vehicle stops, the control circuit 270 may activate the hazard lights and may notify an external apparatus of the emergency situation through the communication circuit 260.

Meanwhile, in the case of a failure in the network inside the vehicle or a failure in the control circuit 270, the control circuit 270 may have difficulty in directly controlling the steering device 230 and the acceleration/deceleration device 240, and therefore the steering device 230 and the acceleration/deceleration device 240 may directly perform stop control.

In one form, the control circuit 270 may transmit a predicted travel path for the first and second time intervals (e.g., 10 s) to the steering device 230 and the acceleration/deceleration device 240, and the steering device 230 and the acceleration/deceleration device 240 may operate for the second time interval to stop the vehicle along the predicted travel path, when the failure in the network inside the vehicle or the failure in the control circuit 270 is detected. Since the steering device 230 and the acceleration/deceleration device 240 cannot compute a travel path, the control circuit 270 may consistently compute a predicted travel path for a specified time interval, while the vehicle performs the autonomous driving, and the control circuit 270 may consistently transmit, to the steering device 230 and the acceleration/deceleration device 240, the predicted travel path computed. The steering device 230 and the acceleration/deceleration device 240 may detect the failure in the network inside the vehicle or the failure in the control circuit 270. When the failure in the network or the failure in the control circuit 270 occurs, the steering device 230 and the acceleration/deceleration device 240 may not be controlled by the control circuit 270, depending on the degree of the failure. When the failure in the network or the control circuit 270 is detected, the steering device 230 and the acceleration/deceleration device 240 may perform lane keeping control and/or inter-vehicle distance keeping control for the first time interval and may perform stop control for the second time interval, depending on the predicted travel path transferred.

The steering device 230 and the acceleration/deceleration device 240 may recognize intervention by the driver of the vehicle while performing the above-described risk reduction strategy and may transfer the control of the vehicle to the driver when the driver intervention is recognized.

Figure 3:
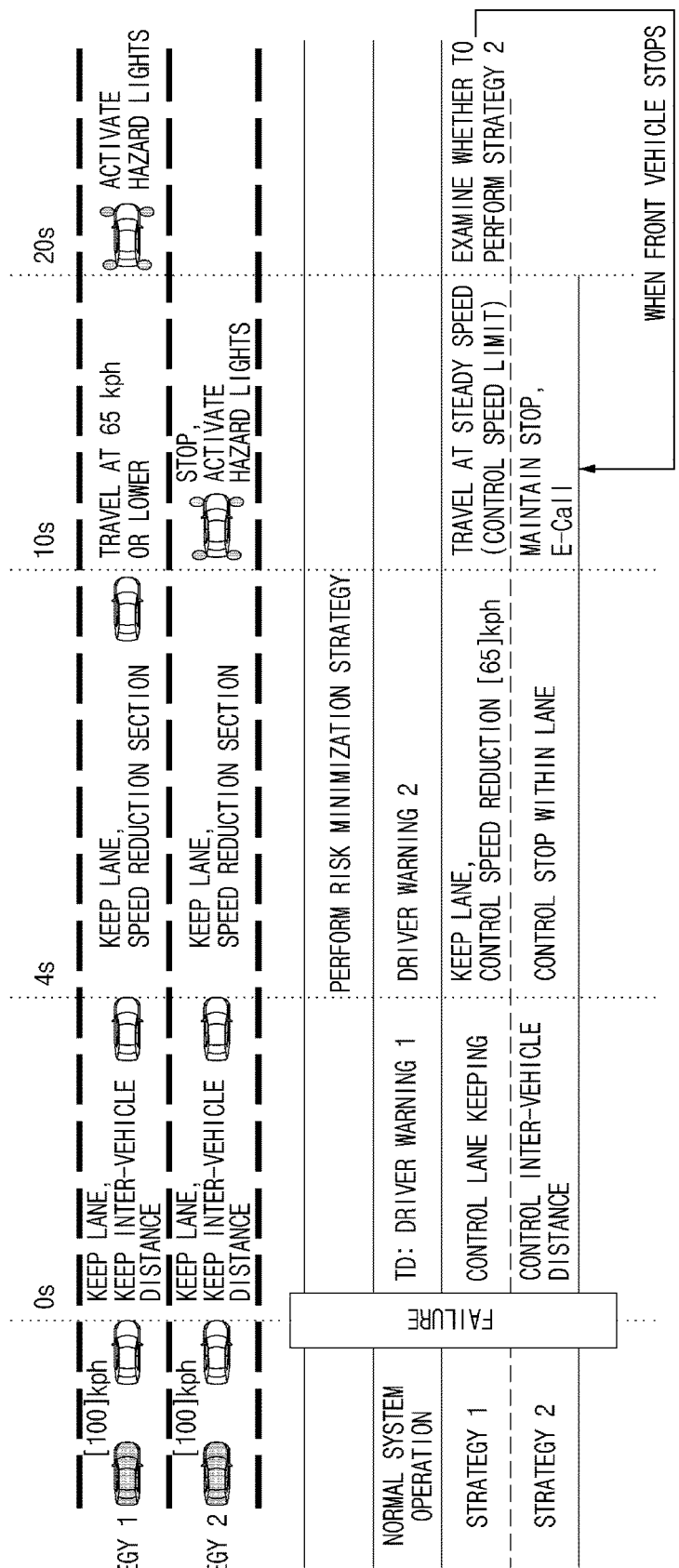
FIG. 3 is a view illustrating an exemplary operation of the vehicle driving control apparatus.

FIG. 3 is a view illustrating an exemplary operation of the vehicle driving control apparatus in one form of the present disclosure.

Referring to FIG. 3, a vehicle may perform autonomous driving on a road at 100 kph. The vehicle may detect a failure associated with the autonomous driving. The vehicle may perform strategy 1 (speed reduction control) or strategy 2 (stop control) depending on the type of the failure.

The vehicle may perform control depending on strategy 1 when a failure included in a first category is detected. According to strategy 1, the vehicle may limit functions of the autonomous driving. The vehicle may only perform lane keeping control and inter-vehicle distance control. When the failure included in the first category is detected, the vehicle may provide a warning for a transfer of control of the vehicle to a driver for 4 s (a first time interval). In this case, for 4 s, the vehicle may maintain the existing control that is performed before the detection of the failure. When the control is not transferred to the driver within 4 s, the vehicle may maintain the warning and may reduce the travel speed to a target speed of 65 kph within 6 s (a second time interval). After 10 s (the first time interval plus the second time interval), the vehicle may perform lane keeping control and inter-vehicle distance control at a speed of not more than 65 kph. For example, the vehicle does not perform lane change control. After 20 s, the vehicle may activate hazard lights.

The driver may be in danger when the vehicle consistently performs the lane keeping control and the inter-vehicle distance control in the state in which the failure has occurred. Therefore, while performing strategy 1, the vehicle may detect that a front vehicle comes to a stop, and may stop in response to the detection. The vehicle may activate the hazard lights after the stop and may remain at rest for safety even if the front vehicle restarts.

The vehicle may perform control depending on strategy 2 when a failure included in a second category is detected. According to strategy 2, the vehicle may perform stop control. When the failure included in the second category is detected, the vehicle may provide a warning for a transfer of control of the vehicle to the driver for 4 s. In this case, for 4 s, the vehicle may maintain the existing control that is performed before the detection of the failure. When the control is not transferred to the driver within 4 s, the vehicle may maintain the warning and may stop within 6 s (the second time interval). The vehicle may activate the hazard lights after the stop or while reducing the travel speed thereof. The vehicle may make connection with a call center to provide notification that the vehicle is in the emergency situation.

Figure 4:
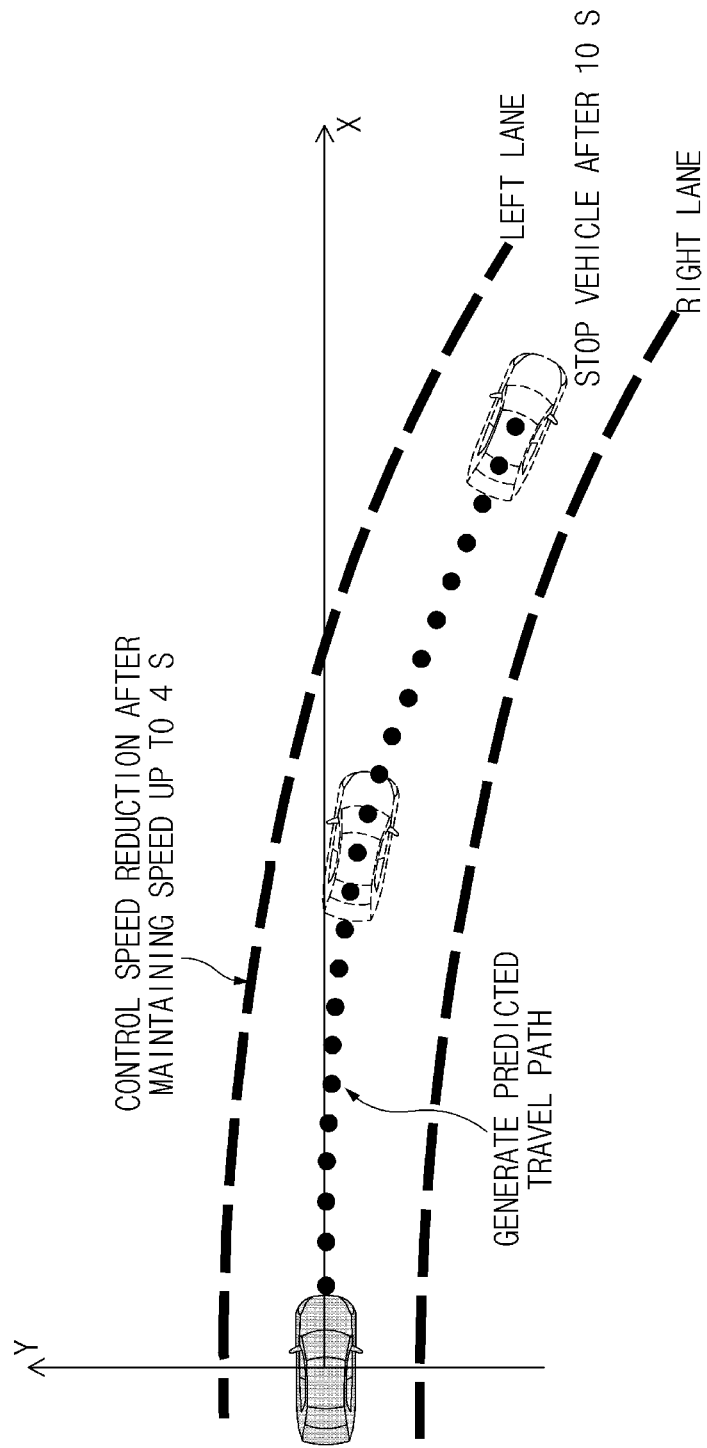
FIG. 4 is a view illustrating an exemplary operation of the vehicle driving control apparatus.

FIG. 4 is a view illustrating an exemplary operation of the vehicle driving control apparatus in another form of the present disclosure.

Referring to FIG. 4, a vehicle may generate a predicted travel path for a specified time interval (e.g., a first time interval plus a second time interval) while performing autonomous driving. A steering device or an acceleration/deceleration device of the vehicle may detect a failure in a network inside the vehicle or a failure in a control circuit. The vehicle may use the predicted travel path to perform strategy 2 which has been described above with reference to FIG. 3.

In one form, the vehicle may consistently generate the predicted travel path up to 10 s from the present time. The predicted travel path may be generated by the control circuit of the vehicle and may be transmitted to the steering device and the acceleration/deceleration device. The predicted travel path may include information on coordinates of a plurality of points relative to the vehicle. The vehicle may compute a predicted travel path that includes information on coordinates of a plurality of points (e.g., 170 points) that are spaced at specified intervals (e.g., 1 minute) from each other within the measurement distance (e.g., 170 meters) of a sensor. The predicted travel path may be a path for lane keeping.

The steering device and the acceleration/deceleration device of the vehicle may perform strategy 2 along the predicted travel path. The vehicle may provide a warning for a transfer of control of the vehicle while travelling along the predicted travel path for 4 seconds after the detection of the failure. The vehicle may perform stop control while travelling along the predicted travel path from 4 seconds to 10 seconds after the detection of the failure. The vehicle may stop at 10 s after the detection of the failure.

Figure 5:
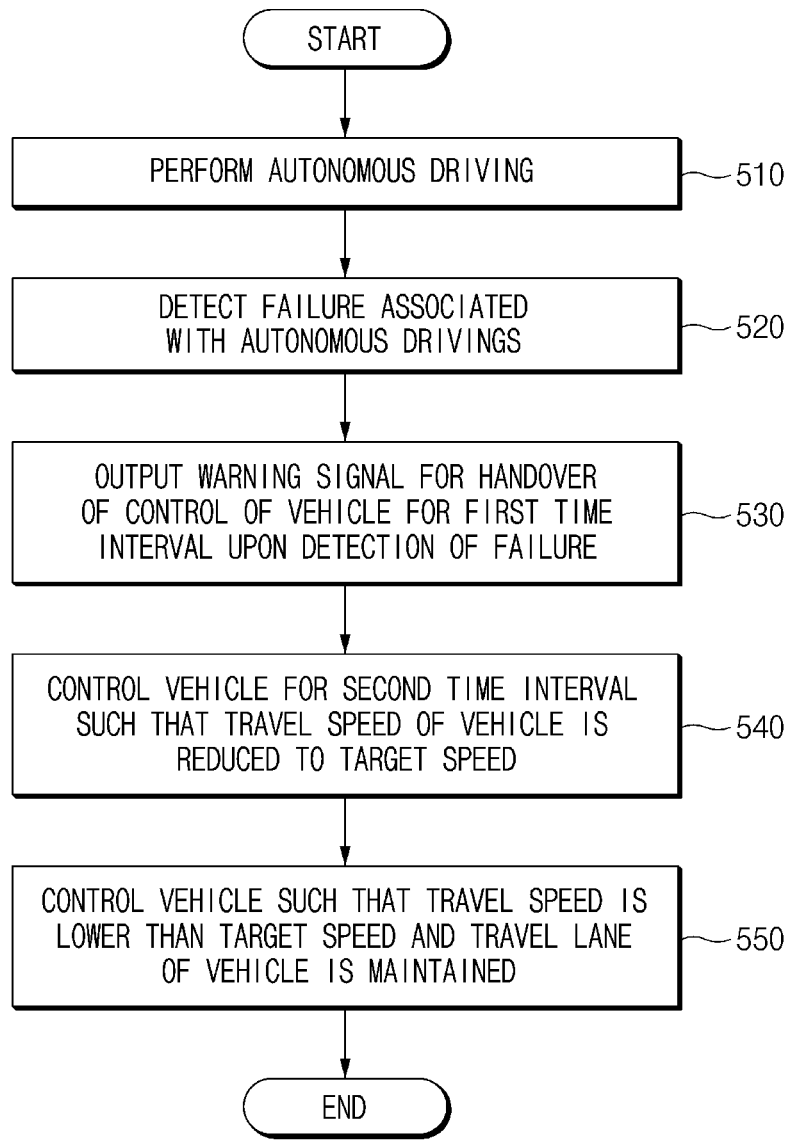
FIG. 5 is a flowchart illustrating a vehicle driving control method.

FIG. 5 is a flowchart illustrating a vehicle driving control method in another form of the present disclosure.

Hereinafter, it is assumed that a vehicle including the apparatus 200 of FIG. 2 performs the process of FIG. 5. Furthermore, it may be understood that operations described as being performed by the vehicle in the description of FIG. 5 are controlled by the control circuit 270 of the apparatus 200.

Referring to FIG. 5, in step 510, the vehicle may perform autonomous driving. For example, the vehicle may monitor a failure in an autonomous driving system while performing the autonomous driving.

In step 520, the vehicle may detect a failure associated with the autonomous driving. For example, the vehicle may detect a failure in the autonomous driving system and may determine the type of the failure.

In step 530, the vehicle may output a warning signal for a handover of control of the vehicle for a first time interval, when the failure is detected. For example, the vehicle may perform lane keeping control and inter-vehicle distance keeping control and may output a visual, auditory, and/or tactile warning signal.

In step 540, the vehicle may make a control for a second time interval such that the travel speed of the vehicle is reduced to a target speed. For example, the vehicle may make a control such that the travel speed is reduced to a target speed that is lower than the target speed before the detection of the failure.

In step 550, the vehicle may make a control such that the travel speed is lower than the target speed and the travel lane of the vehicle is maintained. For example, the vehicle may travel at low speed in order to prevent a rear-end collision with a vehicle behind.

Figure 6:
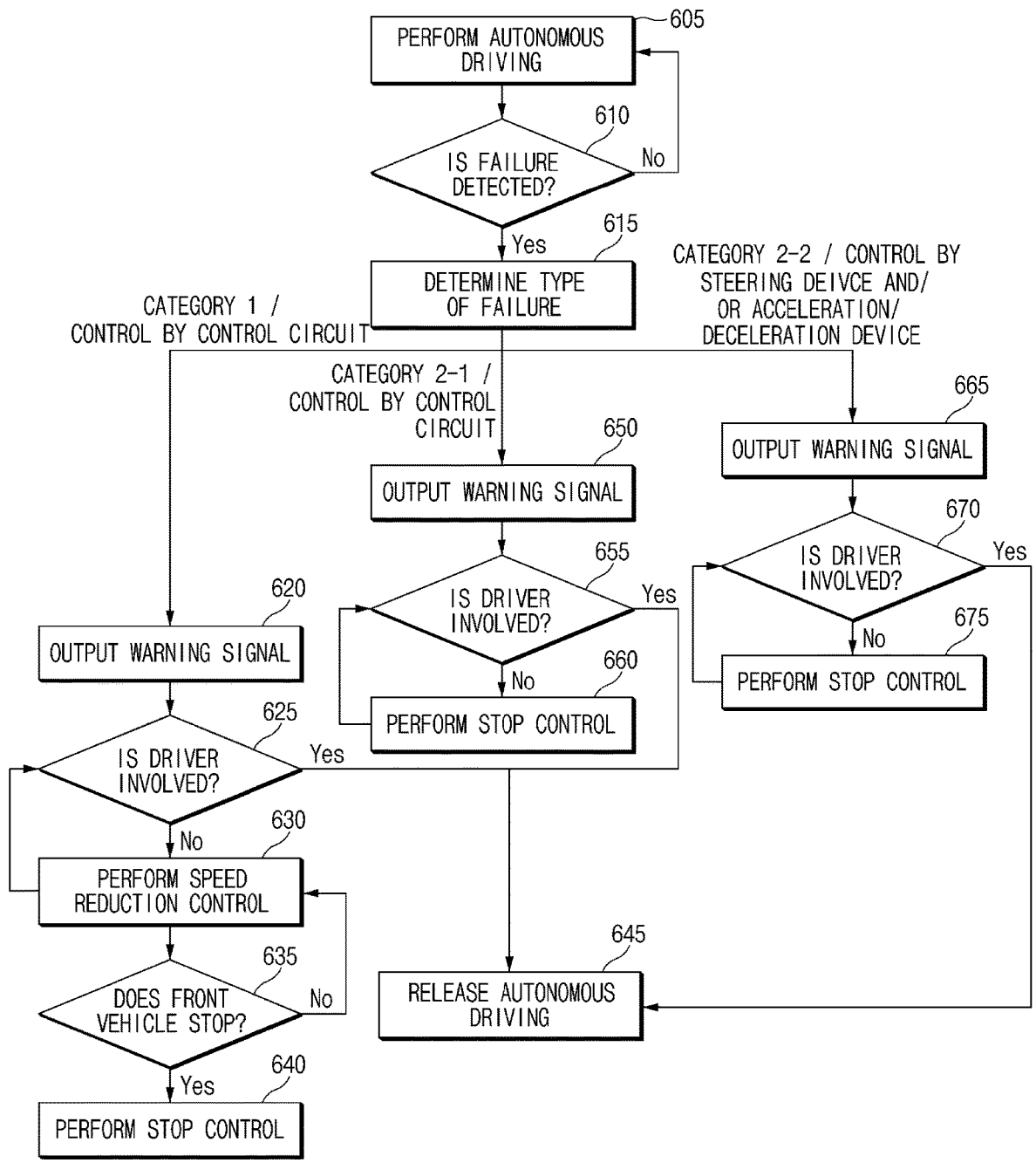
FIG. 6 is a flowchart illustrating a vehicle driving control method.

FIG. 6 is a flowchart illustrating a vehicle driving control method in one form of the present disclosure.

Hereinafter, it is assumed that a vehicle including the apparatus 200 of FIG. 2 performs the process of FIG. 6. Furthermore, it may be understood that operations described as being performed by the vehicle in the description of FIG. 6 are controlled by the control circuit 270 or the steering device 230 and the acceleration/deceleration device 240 of the apparatus 200.

Referring to FIG. 6, in step 605, the vehicle may perform autonomous driving. In step 610, the vehicle may detect a failure in an autonomous driving system. In step 615, the vehicle may determine the type of the failure.

When the failure is included in category 1, the vehicle may perform the following control by using the control circuit. In step 620, the vehicle may output a warning signal. In step 625, the vehicle may determine whether a driver is involved or not. In step 630, the vehicle may perform speed reduction control for a specified target speed when it is determined that there is no driver intervention. While performing the speed reduction control, the vehicle may consistently detect whether the driver is involved or not. In step 635, the vehicle may determine whether a front vehicle comes to a stop or not. In step 640, the vehicle may perform stop control and may remain at rest, when it is determined that the front vehicle stops. In step 645, the vehicle may release the autonomous driving when intervention by the driver is detected.

When the failure is included in category 2-1, the vehicle may perform the following control by using the control circuit. In step 650, the vehicle may output a warning signal. In step 655, the vehicle may determine whether the driver is involved or not. In step 660, the vehicle may perform stop control when it is determined that there is no driver intervention. While performing the stop control, the vehicle may consistently detect whether the driver is involved or not. In step 645, the vehicle may release the autonomous driving when intervention by the driver is detected.

When the failure is included in category 2-2, the vehicle may perform the following control, based on a predicted travel path, by using the steering device and/or the acceleration/deceleration device. In step 665, the vehicle may output a warning signal. In step 670, the vehicle may determine whether the driver is involved or not. In step 675, the vehicle may perform stop control when it is determined that there is no driver intervention. While performing the stop control, the vehicle may consistently detect whether the driver is involved or not. In step 645, the vehicle may release the autonomous driving when intervention by the driver is detected.

Figure 7:
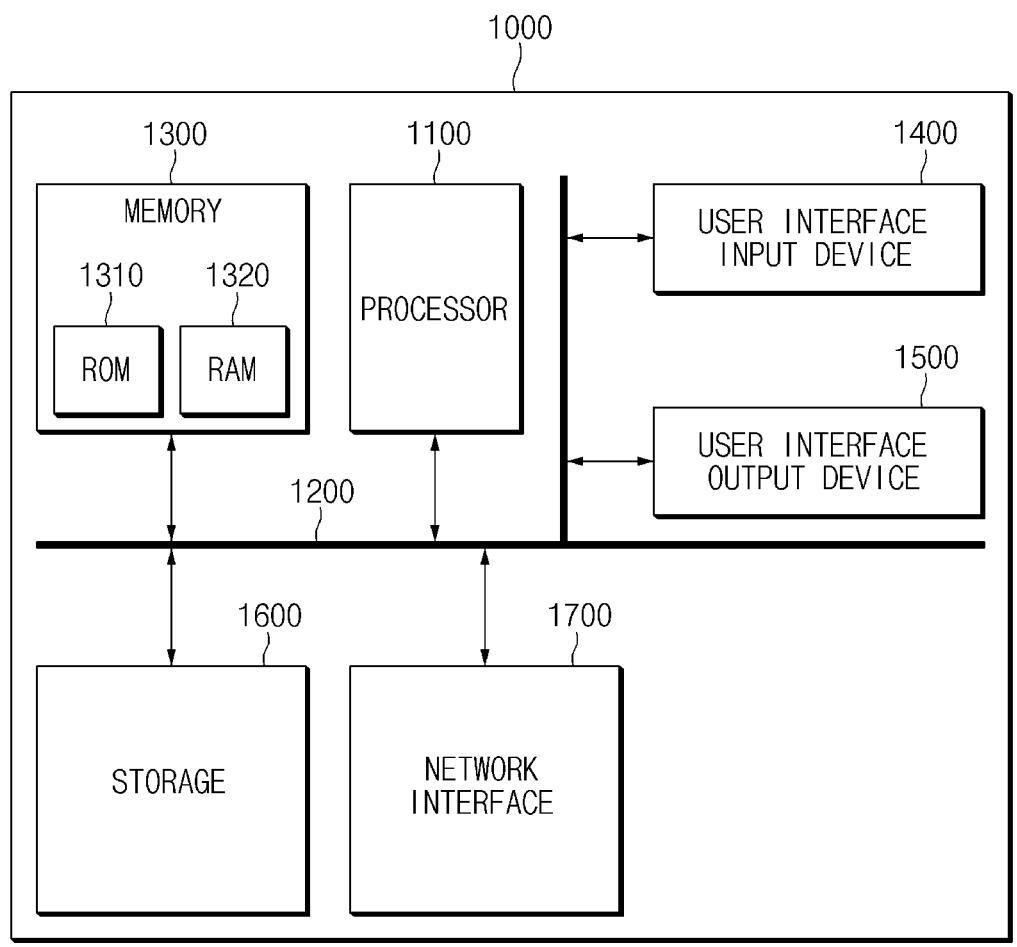
FIG. 7 illustrates a computing system.

FIG. 7 illustrates a computing system in one form of the present disclosure.

Referring to FIG. 7, the above-described methods according to the exemplary forms of the present disclosure may also be implemented through the computing system. The computing system 1000 may include at least one processor 1100, a memory 1300, a user interface input device 1400, a user interface output device 1500, storage 1600, and a network interface 1700 that are connected together through a system bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage mediums. For example, the memory 1300 may include a read only memory (ROM) and a random access memory (RAM).

Accordingly, the steps of the methods or algorithms described above in relation to the exemplary forms disclosed herein may be directly implemented with a hardware module or a software module executed by the processor 1100, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside in a user terminal. In another case, the processor and the storage medium may also reside in the user terminal as separate components.

The vehicle driving control apparatus in the forms of the present disclosure provides various risk reduction strategies, such as warning-signal output, speed reduction control, stop control, and/or notification of an emergency situation, depending on the type of failure associated with autonomous driving, thereby improving the safety of a driver.

In addition, the present disclosure may provide various effects that are directly or indirectly recognized.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, the exemplary forms of the present disclosure are provided to explain the spirit and scope of the present disclosure, but not to limit them, so that the spirit and scope of the present disclosure is not limited by the forms. All technical ideas within the scope equivalent to the present disclosure should be included in the scope of the present disclosure.

What is claimed is:

1. A driving control apparatus for a vehicle, the apparatus comprising:
   an external sensor configured to detect information about surroundings of the vehicle;
   a vehicle sensor configured to detect information of the vehicle;
   a steering device configured to control a steering angle of the vehicle;
   an acceleration/deceleration device configured to control a speed of the vehicle;
   an output device configured to output a warning signal inside the vehicle;
   a communication circuit configured to be in communication with an external device; and
   a control circuit electrically connected to the external sensor, the vehicle sensor, the steering device, the acceleration/deceleration device, the output device, and the communication circuit,
   wherein the control circuit is configured to:
   output the warning signal using the output device for a first time interval, when a failure associated with autonomous driving is detected while the vehicle performs the autonomous driving;
   control the steering device and the acceleration/deceleration device after the first time interval to maintain a travel lane of the vehicle with a travel speed lower than a target speed;
   control the acceleration/deceleration device for a second time interval after the first time interval and reduce the travel speed of the vehicle to the target speed, when the failure is included in a first category; and
   control the acceleration/deceleration device for the second time interval to stop the vehicle, when the failure is included in a second category.

2. The apparatus of claim 1, wherein the control circuit is configured to control the steering device and the acceleration/deceleration device for the first time interval to maintain the travel lane of the vehicle and a distance between the vehicle and a front vehicle, when the failure is detected.

3. The apparatus of claim 1, wherein the control circuit is configured to output the warning signal after the first time interval, when intervention by a driver of the vehicle is not recognized for the first time interval.

4. The apparatus of claim 1, wherein the control circuit is configured to:
   control the acceleration/deceleration device for the second time interval after the first time interval and reduce the travel speed of the vehicle to the target speed; and
   control the acceleration/deceleration device to stop the vehicle and allow the vehicle to remain at rest, when a front vehicle stops after the second time interval.

5. The apparatus of claim 4, wherein the control circuit is configured to activate hazard lights when the vehicle stops.

6. The apparatus of claim 1, wherein the second category includes at least one of inability to track a center of the travel lane, failures in the vehicle sensor, inability to control a distance between the vehicle and a front vehicle, a failure in a network inside the vehicle, or a failure in the control circuit, and wherein the first category includes failures other than the second category.

7. The apparatus of claim 1, wherein the control circuit is configured to activate hazard lights and notify the external device of an emergency situation through the communication circuit, when the vehicle stops.

8. The apparatus of claim 1, wherein the control circuit is configured to transfer control of the vehicle to a driver of the vehicle when intervention by the driver is recognized.

9. The apparatus of claim 1, wherein the control circuit is configured to transmit a predicted travel path for the first time interval and the second time interval after the first time interval, to the steering device and the acceleration/deceleration device, and
   wherein the steering device and the acceleration/deceleration device is configured to operate for the second time interval to stop the vehicle along the predicted travel path, when at least one of a failure in a network inside the vehicle or a failure in the control circuit is detected.

10. The apparatus of claim 9, wherein the steering device and the acceleration/deceleration device are configured to detect the at least one of the failure in the network inside the vehicle or the failure in the control circuit.

11. The apparatus of claim 9, wherein the steering device and the acceleration/deceleration device are configured to transfer control of the vehicle to a driver of the vehicle, when intervention by the driver is recognized.

12. The apparatus of claim 1, wherein the external sensor includes at least one of a radar, a lidar, or a camera.

13. The apparatus of claim 1, wherein the vehicle sensor include at least one of a yaw rate sensor, a tire pressure detection sensor, a steering wheel angle sensor, or a wheel speed sensor.

14. A driving control method for a vehicle, the method comprising:
outputting, by a control circuit, a warning signal for a first time interval, when a failure associated with autonomous driving is detected while the vehicle performs the autonomous driving;
controlling, by the control circuit, the vehicle after the first time interval to maintain a travel lane of the vehicle with a travel speed lower than a target speed;
controlling, by the control circuit, the vehicle for a second time interval after the first time interval to reduce the travel speed of the vehicle to the target speed,
wherein the controlling of the vehicle for the second time interval includes:
controlling the vehicle for the second time interval to reduce the travel speed of the vehicle to the target speed, when the failure is included in a first category; and
controlling the vehicle for the second time interval to stop the vehicle, when the failure is included in a second category.

15. The method of claim 14, further comprising:
controlling, by the control circuit, the vehicle for a second time interval after the first time interval to reduce the travel speed of the vehicle to the target speed; and
controlling, by the control circuit, the vehicle to stop the vehicle and allowing the vehicle to remain at rest, when a front vehicle stops after the second time interval.

16. The method of claim 14, further comprising:
activating, by the control circuit, hazard lights when the vehicle stops; and
notifying, by the control circuit, an external device of an emergency situation.

17. The method of claim 14, further comprising:
transferring, by the control circuit, control of the vehicle to a driver of the vehicle when intervention by the driver is recognized.

18. A driving control apparatus for a vehicle, the apparatus comprising:
at least one external sensor configured to detect information about surroundings of the vehicle;
at least one vehicle sensor configured to detect information about the vehicle;
a steering device configured to control a steering angle of the vehicle;
an acceleration/deceleration device configured to control a speed of the vehicle;
an output device configured to output a warning signal inside the vehicle;
a communication circuit configured to be in communication with an external device; and
a control circuit electrically connected to the at least one external sensor, the at least one vehicle sensor, the steering device, the acceleration/deceleration device, the output device, and the communication circuit,
wherein the control circuit is configured to:
detect a failure associated with autonomous driving while the vehicle performs the autonomous driving;
output the warning signal for a transfer of control of the vehicle by using the output device for a first time interval, when the failure is detected;
control the acceleration/deceleration device for a second time interval after the first time interval and reduce a travel speed of the vehicle to a target speed, when the failure is included in a first category;
control the steering device and the acceleration/deceleration device after the second time interval and maintain a travel lane of the vehicle with the travel speed lower than the target speed; and
control the acceleration/deceleration device for the second time interval to stop the vehicle, when the failure is included in a second category.

\* \* \* \* \*